INVENTOR
ALFRED E. BISHOP
BY L. Greenspan
ATTORNEY

United States Patent Office 3,522,463
Patented Aug. 4, 1970

---

3,522,463
ELECTRON TUBE MULTICOLOR DUAL PERSISTENCE SCREEN COMPRISING PHOSPHOR-COATED PHOSPHOR PARTICLES
Alfred E. Bishop, Lancaster, Pa., assignor to RCA Corporation, a corporation of Delaware
Filed July 15, 1968, Ser. No. 744,887
Int. Cl. H01j 29/18, 29/30, 29/32
U.S. Cl. 313—92                    6 Claims

ABSTRACT OF THE DISCLOSURE

An electron tube having a penetration type luminescent screen which includes phosphor coated phosphor particles of two different types. A particle of the first type is comprised of a core of a first phosphor and a coating thereon of a second phosphor. A particle of the second type is comprised of a core of a third phosphor and a coating thereon of the second phosphor.

At low operational voltages, the second phosphor (the coatings) is excited to emit light of a second color. At high operational voltages, the first phosphor (cores) is excited to emit short persistence light of a first color. The emission from the first phosphor also excites the third phosphor (cores) to emit long persistence light of a third color. Thereby, the viewer may distinguish different displayed information according to the different colors and persistences displayed.

---

BACKGROUND OF THE INVENTION

This invention relates to a novel electron tube having a penetration type luminescent screen which displays information in different colors and different persistences depending upon the applied voltages. As used herein, the persistence of a phosphor is the time required after excitation of the phoshor has ceased for its luminescence to decay to 10% of its initial brightness. One previous tube similar to this type employs two extended layers of phosphor particles; that is, a layer of one phosphor on top of a layer of another phosphor. Display tubes of this type may employ one or more electron guns to excite the screen to luminescence. Such tubes may be used in systems for air traffic control, military identification, stock market quotation, computer data processing, and so forth.

Such previous tubes are difficult to fabricate and may display information only through the characteristics of two phosphors. It is desirable that additional information be displayed to the viewer. Further, it is desirable that the cost to fabricate the tubes be reduced.

SUMMARY OF THE INVENTION

The novel electron tube is comprised of an evacuated envelope, a luminescent screen therein and means for exciting the screen with electrons. The screen is comprised of coated particles of at least two different types. Each of the particles of one type includes a base particle or core of a first phosphor which luminesces with a short persistence, preferably about 0.01 to 1 millisecond in a first color, and a coating thereon of a second phosphor which luminesces with a medium persistence, preferably in 1 to 100 milliseconds in a second color. Each of the particles of the other type includes a base particle or core of a phosphor which luminesces with a long persistence, preferably 100 milliseconds or more in a third color when excited with the luminescence emitted from the first phosphor, and a coating thereon of the second phosphor.

The tube is operated at two voltage levels. At the low voltage level, the second phosphor (the coating) is excited to produce the second color to the viewer. At the high voltage level, the first and third phosphors (from the cores) are excited to produce the first color of short persistence from the first phosphor and the third color of long persistence from the third phosphor. A portion of this short persistence emission is transmitted to the viewer, and a portion of the short persistence emission excites the third phosphor to produce the longer persistence third color emission for the viewer.

The screen is comprised of a mixture of the above described phosphor coated phosphor particles. Such a screen is easily prepared by conventional fabrication processes such as settling, dusting, and spray coating. These processes lend themselves to easy, low cost tube fabrication.

DESCRIPTION OF THE PREFERRED EMBODIMENTS

Figure 1:
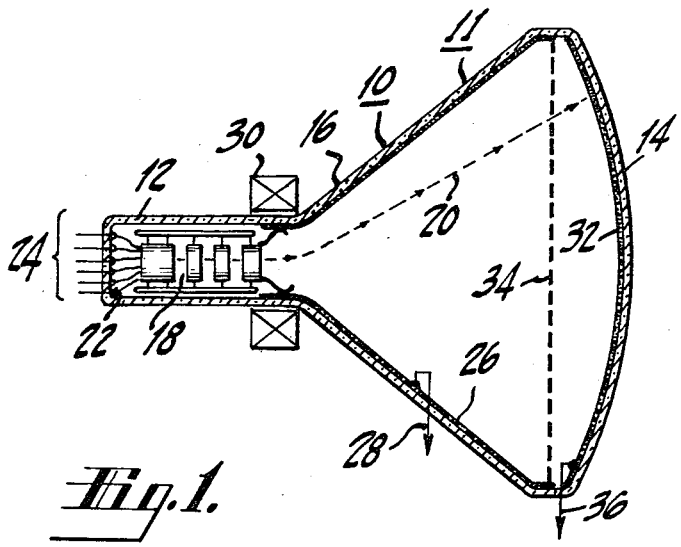
FIG. 1 is a longitudinal section of a novel cathode ray tube incorporating a novel luminescent screen.

FIG. 1 illustrates a novel cathode ray tube 10 comprised of an envelope 11 including a neck 12, a faceplate 14 and an interconnecting funnel 16. An electron gun 18 in the neck 12 is adapted to project a beam 20 of electrons toward the faceplate 14. The neck 12 is closed at one end with a stem structure 22 through which a plurality of lead-in wires 24 is sealed. Suitable operating potential is supplied to the electron gun 18 through the lead-in wires 24. A conducting coating 26 is provided on the internal surface of the funnel 16 and serves as an accelerating electrode for the electron beam 20. A suitable high voltage potential is supplied to the coating electrode 26 through a terminal means sealed through the funnel 16 and schematically represented by the arrow 28. Means, such as a magnetic deflection yoke 30, are provided for deflecting the electron beam 20 to scan a raster over the faceplate 14.

Figure 2:
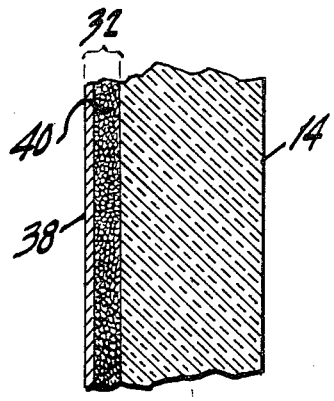
FIG. 2 is an enlarged broken away section of the luminescent screen included in FIG. 1.

A luminescent screen 32 is supported on the internal surface of the faceplate 14 in a position whereby the deflected electron beam 20 may excite the screen 32 to luminescence. FIG. 2 illustrates in more detail the luminescent screen 32 which is comprised of a single layer 40 of phosphor coated phosphor particles. The layer 40 is characterized by having a thickness substantially greater than the size of the coated particles, thus resulting in a multi-particle thick layer 40 which is substantially free of perforations and voids. Because the particles are ordinarily small in size, the layer 32 is relatively thin. A light reflective metal layer 38 of, for example, aluminum, is supported on the phosphor layer 40.

The layer 40 is comprised of a mixture of two different types of phosphor coated phosphor particles. The first type of phosphor particle, illustrated in FIG. 3, includes a core 50 of a short decay cathodoluminescent phosphor. The decay of luminescence is in the range of 0.01 to 1.0 ms. (milliseconds). The core 50 may be, for example, a silver-activated zinc sulfide particle which exhibits a blue emission and a decay of about 0.035 ms. The first core 50 has a usual particle size in the range of 5 to 40 microns. As an alternative structure, the first core 50 may be comprised of a light-transparent, non-luminescent particle or bead having an overall coating thereon of the core phosphor.

The core 50 has a coating 52 of a medium decay cathodoluminescent phosphor. The decay of luminescence of the coating is in the range of 1 to 100 ms. The coating 52 may be, for example, a red-emitting manganese activated zinc magnesium cadmium silicate which exhibits a decay of about 35 ms. The coating phosphor should be in the form of submicron particles.

Figure 3:
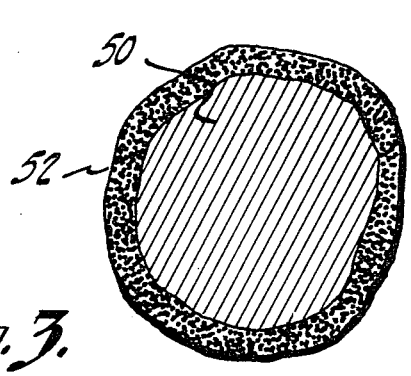
FIG. 3 is a schematic sectional view of one type of phosphor coated phosphor particle used in the screen illustrated in FIGS. 1 and 2.
Figure 4:
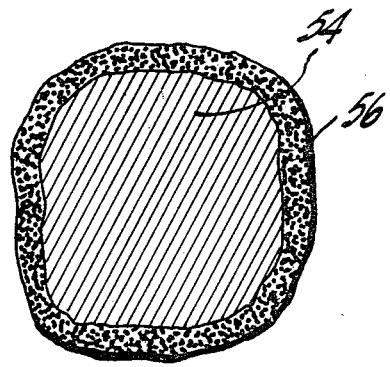
FIG. 4 is a schematic sectional view of the other type of phosphor coated phosphor particle used in the luminescent screens of FIGS. 1 and 2.

The second type of phosphor particle, illustrated in FIG. 4, includes a core 54 of long decay photoluminescent phosphor of the type which is excited by the emission from the cores 50 of the first type particle. The decay of luminescence from the core 54 is in the range of 100 to 1000 ms. or more. The core 50 may be, for example, a copper-activated zinc cadmium sulfide particle which exhibits a yellow-green emission and a decay of about 400 ms. The second core 54 has a usual particle size in the range of 5 to 40 microns. As an alternative structure, the second core 54 may be comprised of a light-transparent, non-luminescent particle or bead having an overall coating thereon of the core phosphor. The second core 54 has a coating 56 which is the same as the coating 52 described in previous paragraph for FIG. 3.

The tube 10 produces an electron beam which may have electrons of different velocities. Means may be provided in the tube 10 for preventing raster size distortion. Such means may take the form of either a mesh 34 disposed transversely within the funnel 16 or other suitable means. Where the electrode 34 is used, it is connected to the coating electrode 26, and the tube 10 is operated according to post acceleration principles. A separate lead-in means as indicated schematically by the arrow 36 may be provided for supplying suitable electric potentials to the metal layer 38 for the purpose of obtaining post acceleration operation if this is so desired. However, the mesh electrode 34 and the separate lead-in wires 36 may be omitted entirely.

The concept of the oepration of the novel tube may be described by reference to FIGS. 3 and 4, which show sectional views of the particles of the two types. In the first type particle (FIG. 3), a medium persistence phosphor 52 coats a short persistence phosphor core 50 whose cathodoluminescence is capable of exciting the phosphor core 54 of the second type particle. In the second type particle (FIG. 4), a long persistence phosphor core 54 absorbs the cathodoluminescent emission from the phosphor core 50 of the first type particle and emits light of a different color and of longer persistence. In operation, low voltage electrons excite principally the first and second coatings 52 and 56 of the coated particles which emit their characteristic emission and associated persistence. High voltage electrons excite principally the first and second cores of the coated particles which emit their characteristic emission with their associated persistences. However, some of their emission from the core 50 of the first particle is absorbed by the core 54 of the second particle which then emits a photoluminescence of longer wave length and longer persistence. The second core 54 may be excited by the high voltage electrons to emit cathodoluminescence of longer wavelength and longer persistence also. Thus, for example, a signal from a source having a low frame rate, such as a PPI radar system, may be displayed in the form of a persistent image by the emission from the core 54, the emission from the core 50 calling attention to the instantaneous presence of a signal from the source. A stationary, or more significantly, a moving reference mark or pattern may be displayed in a second color by the emission from coatings 52 and 56, without creating persistent images that could be confused with or obscure the signals from the aforesaid source having a low frame rate.

In making the phosphor coated phosphor particles, the two types of phosphor coated phosphor particles may be prepared either together or separately. It is preferred to use a coating method described in U.S. Pat. No. 3,275,466 to R. D. Kell. In one application of the Kell method, the first type of particles is prepared by bathing phosphor cores 50 of the first type with a particle-adsorbing mixture, such as gelatin, in water solution. The bath is agitated to wash the cores 50 with the liquid, the cores 50 are then allowed to settle, and the excess liquid is then poured off leaving an adsorbent film on the cores 50. The film coated cores 50 are then washed in water one or more times. Next, the film coated cores 50 are bathed in a suspension of submicron size particles of the second phosphor 52 dispersed in water. The cores are agitated in the suspension whereby the submicron particles of the second phosphor 52 are deposited on and coat the surface of the cores 50 of the first phosphor particles. The phosphor coated particles are then separated from the remaining suspension and washed with water. These latter steps may be repeated to increase the thickness of the phosphor coating 52 on the core 50. When the phosphor coating 52 is thick enough, the particles are washed and stored in water.

After the final application of the phosphor coating material, the phosphor coating 52 may be given a final treatment to improve the adherence thereof. This may be done by washing the coated cores with a solution of formaldehyde, chrome alum, or potassium silicate.

The foregoing steps are repeated using core particles 54 of the third phosphor in place of core particles 50 of the first phosphor to prepare the phosphor coated phosphor particles of the second type.

The desired proportions of the phosphor coated phosphor particles of the first and second types are then blended in the desired proportions by mixing to form an aqueous suspension thereof. This suspension is then used to deposit the phosphor layer 40, as by a slurry coating or by a settling process.

Then, the layer 40 of phosphor coated phosphor particles is filmed and aluminized in a manner known in the art. Typically, an organic heat decomposable film is laid down over the particle layer. The film may, for example, be of a nitrocellulose or an acrylic polymer. A layer 38 of aluminum metal is deposited from the vapor onto the film. Then, the entire screen structure including the aluminum layer 38 is heated whereby the film is removed by volatization. During this baking step, the volatile material in the particle layer 40 is also removed.

A specific combination of commercially-available phosphors which may be used to practice the invention are:

(1) for the first cores 50: RCA–33–Z–20
(2) for the second cores 54: RCA–33–Z–21
(3) for the coatings 52 and 56: RCA–33–Z–275

These phosphors are marketed by Radio Corporation of America, Harrison, N.J.

I claim:
1. An electron tube comprised of an evacuated envelope, a luminescent screen therein and means for exciting said screen with electrons within said envelope, said screen being comprised of coated particles of at least two different types,
   each of the particles of one type being comprised of a base particle of a first phosphor which luminesces with a short persistence $p_1$ in a first color upon excitation with electrons and a coating thereon of a second phosphor which luminesces with a medium persistence $p_2$ in a second color upon excitation with electrons,
   and each of the particles of the other type being comprised of a base particle of a third phosphor which luminesces with a long persistence $p_3$ in a third color upon excitation with the luminescence emission from said first phosphor and a coating thereon of said second phosphor.
2. The tube defined in claim 1 wherein:
$p_3$ is at least ten times longer than $p_1$
$p_2$ is longer than $p_1$
$p_2$ is shorter than $p_3$.
3. The tube defined in claim 1 wherein:
$p_3$ is at least ten times longer than $p_1$

$p_2$ is at least one hundred times longer than $p_1$
$p_2$ is at least ten times shorter than $p_3$.

4. The tube defined in claim 3 wherein:
$p_1$ is about 0.01 to 1 millisecond
$p_2$ is about 1 to 100 milliseconds
$p_3$ is about 100 to 1000 milliseconds.

5. The tube defined in claim 4 wherein said first color is blue, said second color is red, and said third color is yellow to the human eye.

6. The tube defined in claim 5 wherein:
$p_1$ is about 0.035 millisecond
$p_2$ is about 35 milliseconds
$p_3$ is about 400 milliseconds.

References Cited

UNITED STATES PATENTS 3,294,569  12/1966  Messineo et al.

ROBERT SEGAL, Primary Examiner

U.S. Cl. X.R.

117—33.5